Feb. 5, 1952  L. J. AUER  2,584,321
FORMING TOOL
Filed Jan. 11, 1947
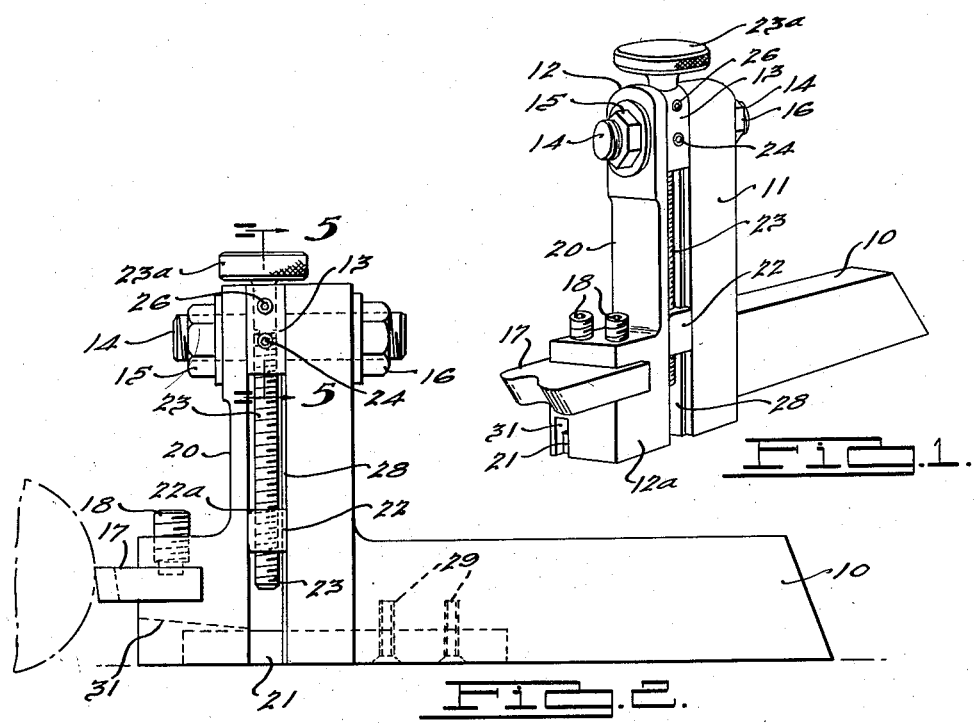
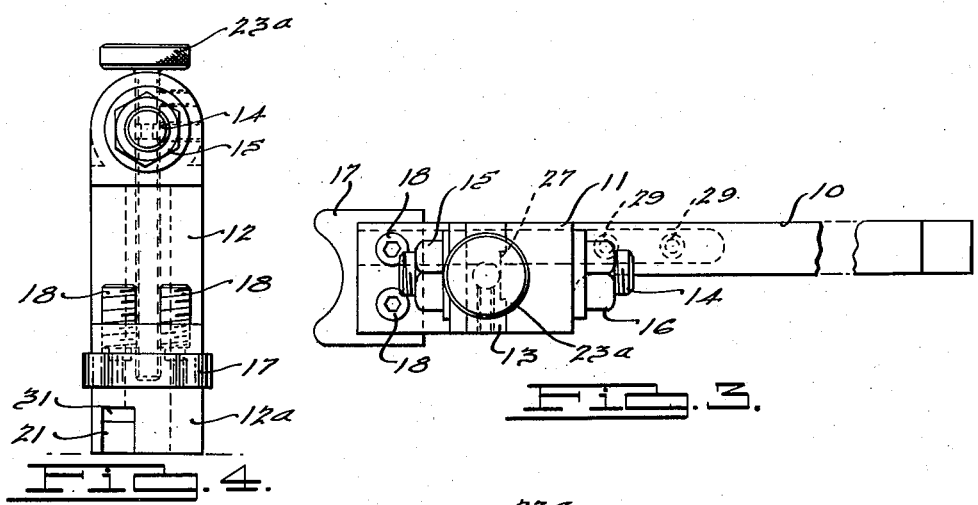
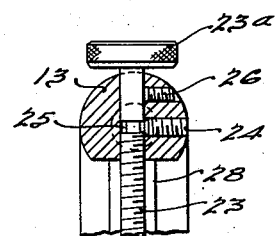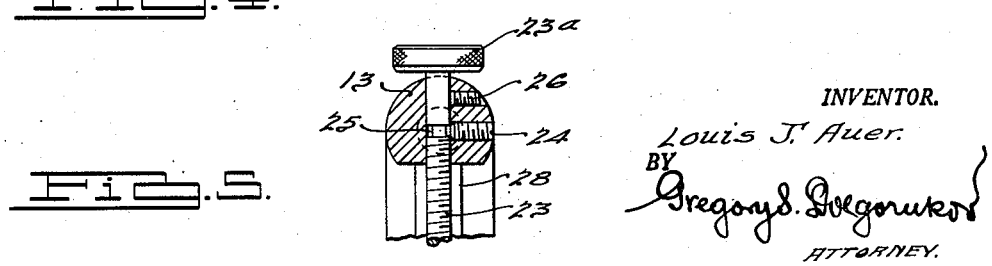
INVENTOR.
Louis J. Auer.
BY
Gregory S. Gregoruk
ATTORNEY.

Patented Feb. 5, 1952

2,584,321

UNITED STATES PATENT OFFICE 2,584,321

FORMING TOOL

Louis J. Auer, Berkley, Mich.

Application January 11, 1947, Serial No. 721,525

3 Claims. (Cl. 29—97.5)

This invention relates to cutting tools and more particularly to an improved forming or scraping tool, suitable for use in various machines such as lathes, shapers, planers, automatic screw machines, and the like.

In the present day machines of the above character, machining of various parts is done mostly by, first, moving the tool into the work to determine "the depth of the cut," and thereupon the "feeding" of the cutting tool sidewise, i. e. by moving the tool along the surface which is being machined rather than by feeding it perpendicularly to said surface or moving it directly into the work. For instance, in a lathe, feeding of the cutting tool is done along the longitudinal axis of a rotating work; feeding of the work in a shaper is done along the plane of the surface being shaped. Feeding of the tool straight into the work is used very rarely, and is limited primarily to the so-called cutting-off tools and forming tools, in the use of which tool the above described sidewise feeding, generally, can not be used.

While feeding of the cutting tools toward the work instead of along the work would have numerous advantages in many machining operations, it is generally avoided due to the difficulties of obtaining smooth cutting in view of chattering of the tool and resulting rough cutting, digging-in of the tool into the work and spoiling the same, twisting or throwing the work out of the machine, or breaking the cutting tool itself. In cases of forming tools, i. e. a tool making curved cuts, or cutting-off tools, that is to say tools with which feeding toward the work cannot be avoided, great difficulties are experienced in the art. Spoiled workpieces and slow, tedious work producing considerable delay in productions are very common with such tools, and such occurrences are considered unavoidable.

One of the objects of the present invention is to provide an improved cutting tool in the use of which the above difficulties are overcome and largely eliminated.

Another object of the present invention is to provide an improved tool which can be fed toward the work and yet produce a smooth cut, without chattering, digging-in of the tool into the work, breaking the tool or throwing the work out of the machine.

A further object of the invention is to provide an improved forming or scraping tool which can be adjusted to produce a smooth cut under various conditions of feeds, speeds as well as with different materials.

A still further object of the invention is to provide an improved forming or scraping tool which can be adjusted for proper cutting under given conditions directly, i. e. in the process of machining, and which can be locked in its adjusted position.

A still further object of the invention is to provide an improved forming or scraping tool with the aid of which many parts which require complicated tool set-ups can be made with the aid of such a forming tool in a much simpler and quicker manner.

A still further object of the invention is to provide an adjustable forming tool in which means are provided to resist a side thrust which may be exerted on the tool by the work.

An added object of the invention is to provide an improved tool of the foregoing character which is simple in construction, safe and dependable in operation, and is relatively inexpensive to manufacture.

Other objects of this invention will appear in the following description and appended claims, reference being had to the accompanying drawings forming a part of this specification, wherein like reference characters designate corresponding parts in the several views.

Fig. 1 is a perspective view of a forming tool embodying the present invention.

Fig. 2 is a side view of the tool of Fig. 1.

Fig. 3 is a top view of the tool.

Fig. 4 is an end view of the tool, looking on the cutter end thereof.

Fig. 5 is a fragmentary sectional view taken in the direction of the arrows on the section plane passing through the line 5—5 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawing there is shown by way of example a forming tool embodying the present invention. It will be understood that while the present invention is illustrated and described as embodied in a forming tool, the invention is applicable to cutting tools of other types, such, for instance, as cutting-off tools, turning and shaping tools, and the like. Referring to the drawing, the forming tool shown therein comprises a shank 10 adapted to be secured in a machine such as a lathe, a shaper, and the like in a manner well known in the art. The shank 10 is provided on a relatively rigid member 11, extending perpendicularly to said shank, but being off-set to one side (as shown) for convenience of operation. To the upper end of the member 11 there is connected a member or resilient beam 12 extending parallel to the member 11, the spacer member 13 being provided between said members 11 and 12. The connection is effected with the aid of a screw 14 having both of its ends threaded and provided with nuts 15 and 16. The free end of the member 12 is adapted to carry a forming cutter 17, insertable into a slot formed in the head portion 12a of the member 12. In the present embodiment of the invention the cutter 17 is secured in place in said slot with the aid of set screws 18, 19. It will be understood that other methods of securing or providing a cutting edge on said beam may be used.

The member 12 is made relatively flexible. In the present embodiment of the invention the desired flexibility of the member 12 is attained by relieving it as shown at 20, and heat-treating the member for spring characteristics. The exact degree of resiliency of the member 12 depends upon the type of work for which the tool is intended, and it is governed by considerations such as materials of the work, width of the cutters and speeds to be used, and the "feed" or thickness of the cut to be taken. For average conditions it may be determined experimentally to produce a member capable of withstanding normal operation loads without breakage or a permanent set, but flexible enough to respond to adjustments described in detail below.

With the construction so far described, the tool forms an arch resilient in at least one of its legs or bars, with the cutter being carried by its resilient leg. In operation due to the pressure of the work on the cutter 17, a component force is produced, which force tends to bend the member 12 and pushes the head 12a of said member toward the member 11. If such bending of the member 12 is not resisted by any special means, the member 12 would be bent to a point determined by its resiliency and by the pressure on the cutter 17. Since bending of the member 12 changes the position of the cutter with respect to the work, it also changes its cutting angles, i. e. the rake angle and the lip clearance, and thus affects the pressure on the cutter. Although the operative conditions may at times so coincide that the pressure on the cutter produced by the changed cutting angles determined by the inherent and constant resiliency of the cutter supporting structure, may produce smooth cutting for a certain "feed," should such feed not be found, the tool will chatter and, in general, will not cut properly. Whatever may be the exact explanation of the correlation of the operative factors involved, I have found that resiliency of cutter support, as such, is not sufficient to ensure proper and smooth cutting by forming cutters. It is my present understanding of the cause of such a phenomenon that it is very difficult to adjust the feed of forming tool to that critical but definite feed required by the thickness of the cut determined by the feed and other mutually interrelated factors. Such critical feed may be different from the automatic feeds available in the machine, which makes such automatic feed entirely unsuitable, and unuseable. On the other side, hand feeding is very difficult to maintain uniform, and a slight change of it may cause chatter or digging the tool into the workpiece.

In accordance with the invention means are provided whereby the cutter may be adjusted for smooth cutting while the cut is being taken. Although hand feed may also be used with my improved tool, its particular advantage is in the fact that it enables the operator to use the automatic feeds available in the machine and adjust the tool for smooth cutting with such automatic feeds. This advantage is of a special importance when my tool is used in automatic screw machines, or machines of similar nature, where hand feeding is not practicable.

The adjustment means performing the above function are exemplified in the present embodiment of the invention by a support piece 22 adjustably movable between the members 11 and 12 with the aid of an adjustment screw 23. The adjustment screw 23 passes through the spacer member 13 and the screw 14 and is rotatably anchored there with the aid of a holding set screw 24 engaging the screw 23 at a groove 25 and restraining the screw 23 from longitudinal movements but permitting rotation thereof. The screw 23 is provided with a knurled head 23a for convenience of manual operation. As the screw 23 is rotated by hand, the support piece 22 moves along the screw toward or away from the cutter 17. It can be clearly seen from an examination of the drawing that such moving of the support piece 22 operates to vary the spring rate of the member 12.

In operation, the support piece 22 is, first, brought closer to the spacer member 13 and the tool is moved toward the work until the cutter 17 engages the work and begins to take a cut. Usually the cutting at this point is slight since the member 12 is rather flexible and the work pushes the cutter away. Thereupon the adjustment screw is operated to move the support piece toward the cutter, thus making the member 12 more rigid and thus causing the cutter 17 to take a heavier and heavier cut as the support piece 22 comes closer to the line of the cutter. At a certain point along the travel of the piece 22, chattering of the cutter begins, indicating that the cut is getting too heavy for the operative conditions. The piece should then be moved back until chattering ceases. The cut at this point will then be substantially the heaviest cut the tool can take smoothly under given operative conditions particularly for the used thickness of cut or "transverse feed."

It should be appreciated at this point that with the conventional tools of this general nature it would be possible sometimes to take a smooth cut, but even with such rare coincidence this would require such a light cut and such slow production as to be impracticable. My improved tool enables the operator to take as heavy a cut as can be taken with the given set of operative conditions, and therefore to speed up the production of the machines in question manifold, and at the same time to produce better work and to eliminate breakage of the cutting tools and spoilage of work. If two transverse feeds are used in machining the same piece, the tool may be adjusted to take a heavier cut with a slight chatter, and finishing cut smoothly. By using such a method, production may be increased still further.

Means are provided to lock the support piece 22 in its adjusted position. I prefer to effect such locking by locking the adjustment screw 23. In the present embodiment of the invention the locking means are exemplified by the locking set screw 26. By providing said screw between the head 23a and the groove 25, breakage of the screw at the neck by turning it hard in its locked position is prevented.

Guiding means for the support piece 22 are provided. Such means are exemplified by a shallow slot 27 provided on the piece 22, which slot is engaged by the ridge 28 provided on the members 11 and running longitudinally thereof. The edges of the support piece 22 at the member 12 may be rounded as shown at 22a to prevent excessive local pressure thereof against the member 12 and metal-to-metal contacts when said member is bent and adjustment has to be made with the cut being taken. By virtue of such an expedient turning of the screw 23 is made much easier.

In accordance with the invention means are also provided to resist the side thrust or pressure which may be exerted on the cutter by the work. Such pressure depends, in part, on the configuration of the cutter, and it may be directed to either side. In the present embodiment of the invention said means are exemplified by a tongue 21 extending longitudinally of the tool and secured to the shank 10 in any suitable manner such as with the aid of screws 29, 29, and engaging a slot 30 provided in the member 12. Thus the side pressure on the member 12 is transmitted through the tongue 21 to the shank 10 and is resisted thereby. The slot 30 is relieved as indicated at 31 to permit bending of the member 12 without affecting the tongue 21.

It may now be seen in view of the foregoing that my improved forming tool may be easily disassembled for repairs or changing parts. A set of members 12 of various degrees of resiliency or strength may be provided and used in the same tool. It can be easily appreciated that for changing a member 12, it is only necessary to take off the nut 15 after which one member 12 may be removed and another one of different spring characteristics be installed. It may also be understood that when it is desired to make the member 12 substantially rigid in operation, the support piece 22 may be moved substantially to the end of the screw 23 or in line with the cutter 17. This may be desirable when cutters other than those fed directly into the work are used, such as conventional turning or shaping cutters. By such use of my improved cutting tool, with only slight adjustments thereof exceedingly heavy cuts may be taken with sidewise feed tools, which cuts would be entirely out of question with conventional cutting tool holders.

There is thus provided an improved tool whereby the objects of the present invention listed above and numerous additional advantages are attained.

I claim:

1. A forming tool comprising a resilient arch having parallel bars, a shank on one of said bars for securing the tool in a machine, the other bar of said arch having its free end adapted to carry a forming cutter, a support piece slidable between said bars longitudinally thereof, and screw means for adjustably moving said support piece along said bars for adjustably varying the spring rate of said cutter-carrying bar.

2. A forming tool comprising two parallel members having connected ends, one of said members being substantially rigid and the other being flexible, a shank provided on said rigid member for securing the tool in a machine, the flexible member of said arch having its free end adapted to carry a forming cutter, a support piece contacting both of said members and slidable longitudinally between them to vary the spring rate of said flexible member, and screw means for adjustably moving said support piece.

3. A forming tool comprising two parallel members having connected ends, a shank provided on one of said members for securing the tool in a machine, the other member of said arch having its free end adapted to carry a forming cutter, a support piece contacting both of said members and slidable longitudinally between them to vary the spring rate of said cutter-carrying member, and screw means for adjustably moving said support piece, and locking means for said screw means for locking the same in a determined position.

LOUIS J. AUER.

REFERENCES CITED

The following references are of record in the file of this patent:

UNITED STATES PATENTS

| Number | Name | Date |
|---|---|---|
| 71,401 | Meinhard | Nov. 26, 1867 |
| 1,416,832 | Johannson | May 23, 1922 |
| 1,423,245 | Moore | July 18, 1922 |
| 1,606,718 | Orup | Nov. 9, 1926 |
| 2,371,715 | Smith et al. | Mar. 20, 1945 |
| 2,445,013 | Winkler | July 13, 1948 |